(12) United States Patent
Dugan

(10) Patent No.: US 6,427,801 B1
(45) Date of Patent: Aug. 6, 2002

(54) APPARATUS FOR REDUCING NOISE IN THE JET ENGINE

(76) Inventor: John J. Dugan, P.O. Box 11186, Bainbridge Island, WA (US) 98110

(*) Notice: Subject to any disclaimer, the term of this patent is extended or adjusted under 35 U.S.C. 154(b) by 31 days.

(21) Appl. No.: 09/636,103

(22) Filed: Aug. 10, 2000

(51) Int. Cl.[7] .............................. F01N 1/14; B64D 33/04
(52) U.S. Cl. ....................... 181/215; 181/219; 181/220; 239/265.13
(58) Field of Search ................................. 181/213, 214, 181/215, 216, 219, 220, 221; 239/265.13, 265.17, 265.19, 265.29, 265.31, 265.33; 60/204, 262, 226.2

(56) References Cited

U.S. PATENT DOCUMENTS

| | | | |
|---|---|---|---|
| 3,581,841 A | | 6/1971 | Raynes |
| 3,583,640 A | | 6/1971 | MacDonald |
| 3,591,085 A | | 7/1971 | Medawar et al. |
| 3,598,318 A | * | 8/1971 | Schiel ................... 239/265.13 |
| 3,614,037 A | | 10/1971 | Vdolek |
| 3,710,890 A | | 1/1973 | True et al. |
| 3,749,316 A | | 7/1973 | Tontini |
| 3,779,010 A | * | 12/1973 | Chamay et al. ............ 60/226.2 |
| 4,501,393 A | * | 2/1985 | Klees et al. ........... 239/265.13 |
| 5,826,794 A | | 10/1998 | Rudolph |
| 5,987,880 A | * | 11/1999 | Culbertson ................... 60/204 |

* cited by examiner

Primary Examiner—Khanh Dang
(74) Attorney, Agent, or Firm—Jensen & Puntigam, PS

(57) ABSTRACT

A apparatus and method for augmenting the thrust of a jet engine while reducing the noise generated thereby, including extending the thrust reverser sleeve, exposing the cascades while retaining the thrust reverser doors or buckets in their stowed position.

4 Claims, 2 Drawing Sheets

APPARATUS FOR REDUCING NOISE IN THE JET ENGINE

TECHNICAL FIELD

This invention relates to a jet engine and more particularly to a method and apparatus for reducing noise during takeoff and landing of a jet airplane, wherein the thrust reverser mechanism is utilized to introduce ambient air by moving the aft portion of the cowling or nacelle rearwardly exposing the reverser cascades or apertures and retaining the reverser doors in the stowed position. When necessary or desired, the reverser doors or buckets may be deployed, and the thrust reverser will operate in normal fashion.

BACKGROUND OF THE INVENTION

As the amount of air traffic has increased, people have become more aware of the damage and inconvenience of the noise. As a result some airports restrict the amount of traffic, and more and more airports are limiting the amount of noise allowed. In fact, the FAA has imposed noise limits on takeoff and landing, and further restrictions are in the offing.

Historically, as noted in the prior art, elaborate mechanisms have been developed to reduce the amount of noise, but these devices have been somewhat self-defeating, in that they increase the weight of the airplane, thereby decreasing the effective pay load, and they increase the mechanisms of the craft, resulting in a greater possibility of breakdown and increased cost.

Prior art known to the inventor includes:

U.S. Pat. No. 3,581,841 granted to Raynes on Jun. 8, 1971, which discloses thrust reversing and noise suppressing apparatus which includes tubular ejectors around a thrust nozzle from the sound-suppressing deployed position, the ejectors telescope relative to one another during normal flight and the doors are deployed.

U.S. Pat. No. 3,583,640 granted to MacDonald on Jun. 8, 1971, discloses vertically stacked thrust nozzles and thrust reversing doors opposite from the nozzles for movement between a stowed position adjacent to nozzles and a partially deployed position which deflects slipstream air against the exhaust gas, in a fully deployed position the doors abut and deflect the exhaust gas forwardly.

U.S. Pat. No. 3,591,085 granted to Medawar et.al on Jul. 6, 1971, discloses a sound suppressing and thrust reversing apparatus, wherein the shroud has an included ejector and reverser support ring nested for normal flight and extended for sound suppression and/or thrust reversing.

U.S. Pat. No. 3,710,890 granted to True et.al on Jan. 16, 1973, discloses an attachment for a jet engine, and an ejector shroud is closely spaced around the lobes, introducing large quantities of ambient air, reducing the air velocity attendant to the jet noise levels.

U.S. Pat. No. 3,614,037 granted to Vdolek on Oct. 19, 1971, discloses a combination thrust reverser and sound suppressor which is packaged together in a housing attached to the rear of the aircraft and the thrust reverser doors are located around the housing spaced between the sound suppressor chutes.

U.S. Pat. No. 3,749,316 granted to Tontini on Jul. 31, 1973, discloses a sound suppressing ejector nozzle which is positioned aft of the exhaust nozzle and defines, with the nozzle, inlet passages for a free stream of air.

U.S. Pat. No. 3,910,375 granted to Hache et.al on Oct. 7, 1975, discloses a jet engine silencer for an engine having a thrust nozzle, wherein the gas jet is placed in contact with air issuing from the central body portion of the silencer.

U.S. Pat. No. 5,154,052 granted to Giffin III et.al on Oct. 13, 1992, discloses an exhaust assembly for a gas turbine engine.

U.S. Pat. No. 5,826,794 granted to Rudolph on Oct. 27, 1998, discloses an aircraft scoop ejector nozzle for reducing exhaust noise in an intermediate bypass ratio turbo fan engine.

U.S. Pat. No. 5,884,472, granted to Presz, Jr. et.al on Mar. 23, 1999, discloses a noise suppressor comprising a mixing ring of alternating lobes attached to the engine's tailpipe.

SUMMARY OF THE INVENTION

With the above-noted prior art and problems in mind, it is an object of the present invention to provide a method and apparatus for suppression of a jet engine utilizing the mechanisms already in place, in a different fashion to accomplish noise suppression.

It is another object of the present invention to take a standard jet engine including a thrust reverser, and by modifying the control, and therefore the relative location of the reverser mechanism, utilize the mechanism as a sound suppressor and a thrust augmenter.

Still a further object of the present invention is to utilize a currently available mechanisms on a jet engine, and by modifying their operation, reduce the noise generated thereby.

BRIEF DESCRIPTION OF THE DRAWINGS

As seen in FIG. 1, a simplified illustration of a turbo fan type jet engine is illustrated with the majority of parts either eliminated or shown in outline for simplicity so as to not detract from the invention.

FIG. 1 is illustrative of two phases of the current invention, with the top portion of the figure illustrating the engine configuration in the noise suppressing configuration for takeoff and landing, and the bottom half of the illustration depicts the configuration during the thrust reversing process. At the center of the illustration and overlapping both halves is the main engine 2 which may include a mixer 4 toward the rear of the turbine casing 6, and also includes an exhaust nozzle.

Surrounding the engine components 2 through 6 is a nacelle or cowling 8 having a forward section 10 and an aft section 12, which during normal operation, assume the configuration as shown in FIG. 2, wherein identical numerals are used to identify identical parts in FIG. 1.

Figure 1:
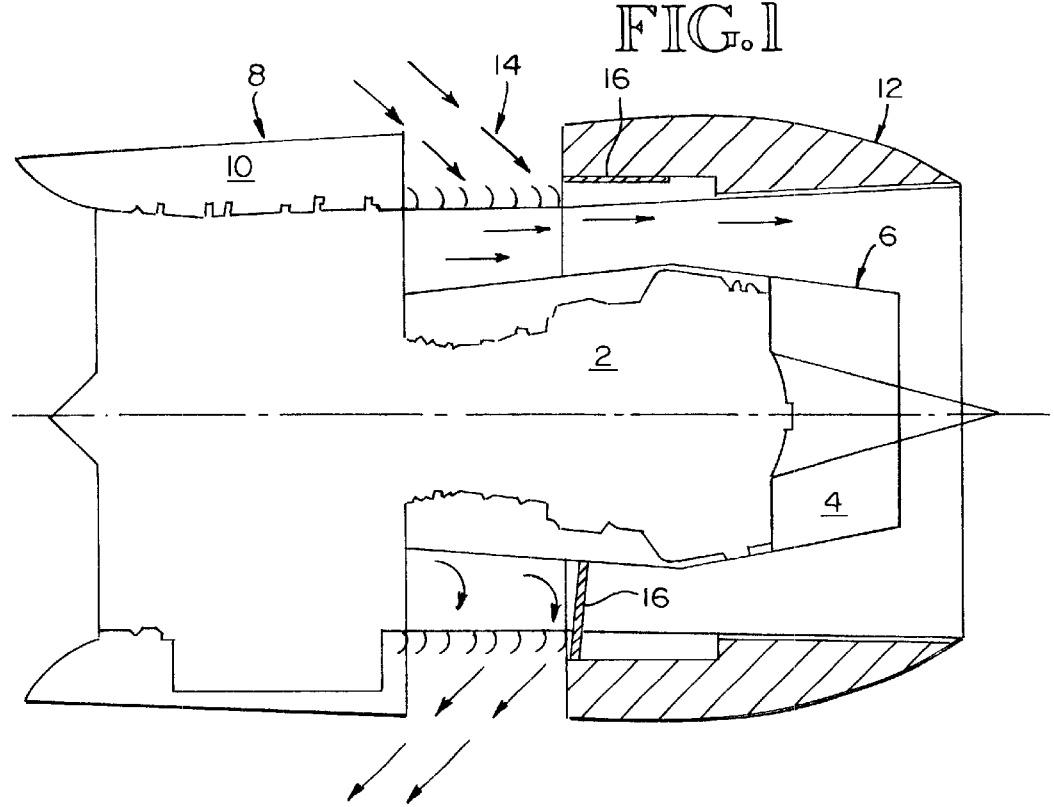
FIG. 1 is a simplified illustration of a turbo fan engine, wherein the upper half of the configuration is in the sound suppressing mode, and the lower half in the thrust reversing mode.

The aft portion 12 of the nacelle, however, is translated rearwardly in FIG. 1 exposing a plurality of apertures or cascades 14 around the nacelle 8 which as illustrated in FIG. 1, top half, admit ambient air which mixes with the fan air and eventually with the exhaust out of the exhaust nozzle. The mixture has the effect of reducing the overall velocity of the jet exhaust and increasing the velocity of the attached ambient air relative to the overall jet exhaust mass air. This gas velocity modification reduces the level of kinetic energy created by the differences in the untreated jet velocity and the untreated ambient air speed, thereby, dramatically reducing ambient engine noise.

It is acknowledged that there exist fixed inducers attached to an airplane's engine in various configurations. The present invention introduces similar ambient air induction theory without the corresponding drag during normal cruise operation. The present invention introduces ambient air without the corresponding drag and, properly applied, can be adapted to existing thrust reversers without the addition of either forward or aft inducer.

Referring to the bottom half of FIG. 1, it can be seen that when the thrust reverser blocker door 16, which was stowed in the upper half, has been deployed, air is forced forwardly through the cascades 14, creating a reverse air flow to stop the forward motion of the engine and plane to which it is attached.

Figure 2:
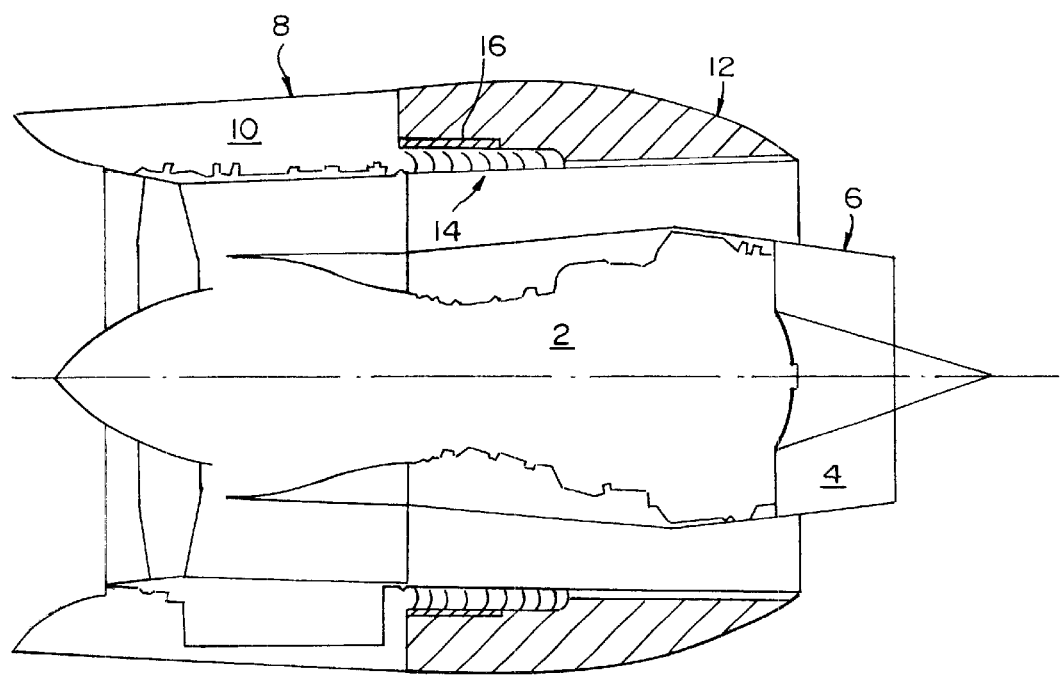
FIG. 2 is an illustration of the engine of FIG. 1 in the normal flying mode.
Figure 3:
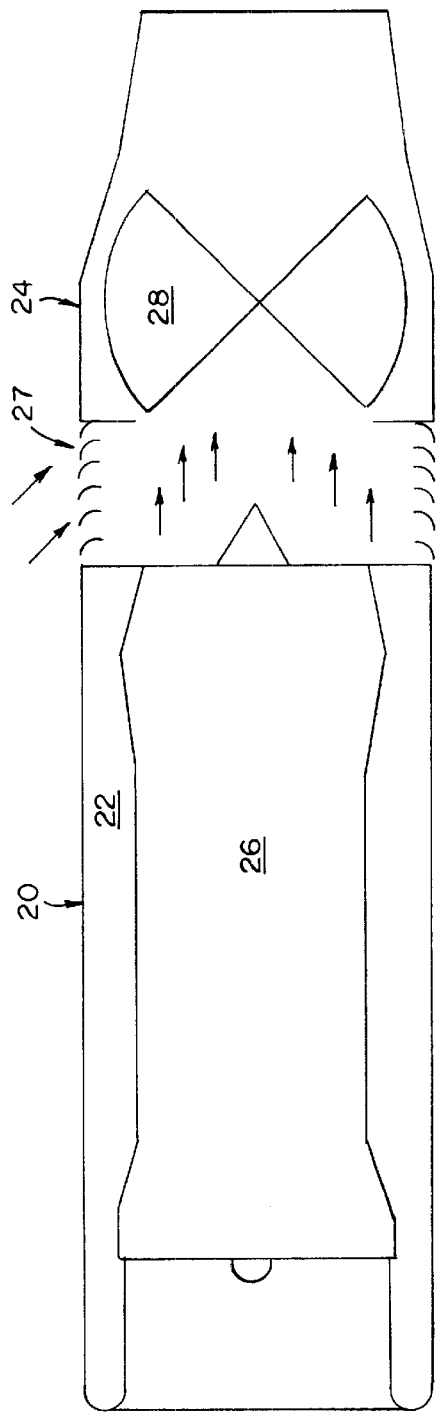
FIG. 3 is a simplified illustration of a ducted fan jet engine in the sound suppressing mode.
Figure 4:
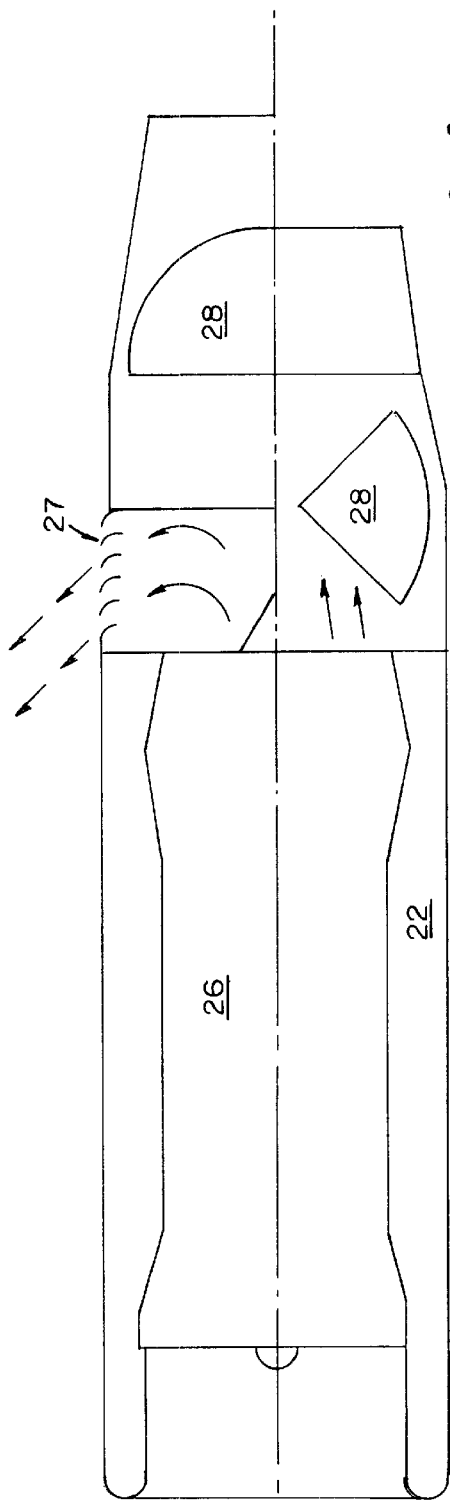
FIG. 4 is an illustration of the engine in FIG. 3 with the top half the thrust reversing mode and the bottom half in the cruising mode.

Direct reference is now had to FIGS. 3 and 4 which illustrate a very simplified ducted fan engine utilizing the same principle as with respect to turbo fan illustrated in FIGS. 1 and 2. The structure includes a nacelle or cowling 20 having a forward section 22 and a rearward section 24 surrounding an engine 26. FIG. 3 illustrates the engine in the noise suppression mode, wherein the aft portion of the nacelle 24 has been translated rearwardly exposing the apertures or cascades 27 around the cowling for the induction of ambient air to mix with the fan and exhaust air. The reverser buckets 28 are stowed allowing the air to pass therethrough, again by inducing the ambient air, reducing the relative velocities and thus reducing the resultant noise.

FIG. 4 is similar to FIG. 1 in that the illustration is divided into two halves, wherein the upper half illustrates the bucket 28 deployed in the thrust reversing position as shown by the air flow arrows, and the lower portion in the normal cruise position, wherein the aft portion 24 of the nacelle or cowling 20 is adjacent the forward portion 22 covering the cascades or apertures 27 and forming a relatively unrestricted air stream past the stowed buckets 28.

Thus, as can be seen, the present invention does not burden the currently existing engines with additional weight and/or hardware, but by modifying the operation and controls of the existing hardware, allows the pilot to selectively use the hardware to reduce engine noise.

The container formed in modern jet and turbo jet engines by the retracted aft portion of the nacelle or cowling and the restricted exhaust nozzle create a condition addressed in the standard kinetic theory, and releases the contained pressurized kinetic energy as pollutant noise.

As seen in FIG. 3, by translating the container aft nacelle section, sometimes known as the thrust reverser sleeve, with the blocker doors or buckets still stowed, thereby opening up the reverser cascades or apertures to the ambient air velocity upstream, the average velocity of the gases in the container is reduced. The induction of lower velocity gas into the higher velocity fan and/or jet stream by translating the aft portion without blocking the flow, mechanically creates a flexible, translating inducer. Executing or translating the aft portion or thrust reverser sleeve translation without blocking, creates an inducer as opposed to the thrust reverser which is standard when the flow is blocked by the blocker doors or buckets.

In the present application of the kinetic theory, the flow in the translated sleeve of the thrust reverser is not blocked, completing the new event that dramatically reduces the kinetic energy and the noise this ineffective energy produces. This resultant, modified gas stream will be quieter and more thrust efficient, since the random kinetic energy producing the noise is reduced by the new induced ambient air flow into the translated sleeve through the cascades, and the induced mass flow of the gas path particle stream is more uniform in its direction to provide effective thrust with less noise.

To convert the standard thrust reverser into a noise reducing device, while maintaining the desirable characteristics of the thrust reverser, the buckets and/or blocker doors are operated independently of the translating aft sleeve function.

This transition is accomplished in the preferred embodiment by introducing an actuator system in the thrust reverser linkage under the control of the flight crew. The actuator or actuators will not function only when thrust reversing is desired. When activated, only forward thrust is produced, and the blocker doors will remain stowed whenever the thrust reverser is translated aft. To disengage these actuators from functioning by not restraining the blocker doors or buckets from blocking the gas stream and forcing it through the reverser cascades, a full reverse event is required in the operating procedure.

Although, it is certainly subject to further modification, the invention currently utilizes at least two operating cycles. In a fairly standard control configuration, the reverse thrust is engaged by the cockpit throttle, when the throttle is lifted over a reverser gate of the throttle quadrant. This procedure can remain standard. Should this be the objective, the engine noise reduction system will always be deactivated if the throttles are lifted over the reverse gate of the quadrant into the reverser range of the throttle quadrant.

In this configuration if noise reduction is subsequently desired, the takeoff procedure would have the engine noise reduction feature applied in the forward thrust range only. When activated, this feature will prevent the blocker doors and/or buckets from deploying, while causing the thrust reverser sleeve to translate and open the reverser cascades to the ambient air stream, creating noise reduction. The engine noise reduction feature may be applied every time takeoff is desired, or only when noise reduction is desired.

The flight crew may introduce the engine noise reduction feature to translate the thrust reverser sleeve with the blocker and/or buckets stowed while taxiing to the takeoff threshold. The throttles would be in the forward thrust range of the throttle quadrant, as the airplane is taxiing. While the engine noise reduction is now activated, and the blockers and/or buckets are stowed with the thrust reverser sleeve translated, and all throttles are forward of the reverser gate, all operating takeoff and initial climb procedures remain unchanged. At cutback, the engine noise reduction feature would then be automatically or manually disengaged by the flight crew. It would appear logical that the engine noise reduction system is activated on each engine independently by depressing an automatic hold-down type button that illuminates to indicate to the flight crew that the engine noise reduction is initiated and the thrust reverser sleeve has translated and that the blocker doors or buckets are stowed. The system can be deactivated by either pulling out this hold-down button, or returning the throttle to the idle range after they have first been advanced to the takeoff range as long as the squat switch has not been activated, or alternatively by lifting the throttles over the full reverse gates of the throttle quadrant. The full reverse selection will always override the engine noise reduction system, thereby rendering the engine noise reduction system as fail-safe, either forward of the reverser gate, or aft of the reverser gate.

It may be preferable on some installations to leave the forward thrust throttle quadrant range unmodified, and to use the full reverse range for full reverse and for engine noise reduction takeoff. If this is desired, the engine noise reduction hold-down buttons would only operate after the gate of the throttle quadrant range. If full reverse is subsequently desired, the engine noise reduction buttons would be manually disengaged, permitting the blocker doors or buckets to deploy. An engine noise reduction would also be automatically disengaged when the throttles are advanced and dropped through the gate at cut back, permitting the thrust reverser sleeve to retract. In this configuration the engine is in engine noise reduction takeoff operation after initial takeoff is performed, and after the first segment of climb has been accomplished, the throttle would be advanced to the idle gate to cut back, causing the thrust reverser sleeve to retract and disarming the engine noise reduction, and when then the throttles are advanced further to initiate the second segment of climb as is normally performed to continue the climb to cruise altitude.

Thus, as can be seen, the present invention allows selective engine noise reduction with minor modifications to the engine configuration, the only modification being to the control sector.

What is claimed is:

1. A method of modifying the flight characteristics of an existing jet airplane having engines which include a linearly translatable nacelle and thrust reverser means used in conjunction therewith to slow the forward movement of the airplane, comprising:

modifying both the cockpit controls and the actual control elements, such that the nacelle may be translated independent from the thrust reverser, such that the engine is capable of operating under three conditions: the normal flight condition with the nacelle not translated and the thrust reverser stowed; a second condition when it is desired to have decreased noise and/or increased thrust with the thrust reverser stowed and the nacelle translated; as well as the standard configuration with the nacelle translated and the thrust reverser deployed for stopping the forward movement of the airplane.

2. A method as in claim 1, wherein the flight characteristics are controlled by the throttle position.

3. A method as in claim 1, wherein some of the flight characteristics are controlled by a separate switch.

4. A method as in claim 1, wherein each engine is independently activated.

* * * * *